(12) United States Patent
DiOrio

(10) Patent No.: US 11,353,780 B2
(45) Date of Patent: Jun. 7, 2022

(54) FOLDING STAND FOR A CELL PHONE CAMERA

(71) Applicant: Joseph Anthony DiOrio, Huntington Beach, CA (US)

(72) Inventor: Joseph Anthony DiOrio, Huntington Beach, CA (US)

(*) Notice: Subject to any disclaimer, the term of this patent is extended or adjusted under 35 U.S.C. 154(b) by 210 days.

(21) Appl. No.: 16/852,428

(22) Filed: Apr. 18, 2020

(65) Prior Publication Data

US 2020/0387055 A1 Dec. 10, 2020

Related U.S. Application Data

(60) Provisional application No. 62/858,432, filed on Jun. 7, 2019.

(51) Int. Cl.
*G03B 17/56* (2021.01)
*H04B 1/3877* (2015.01)
*H04M 1/04* (2006.01)

(52) U.S. Cl.
CPC ......... *G03B 17/561* (2013.01); *H04B 1/3877* (2013.01); *H04M 1/04* (2013.01)

(58) Field of Classification Search
CPC .................................................. G03B 17/561
See application file for complete search history.

(56) References Cited

U.S. PATENT DOCUMENTS

| 8,303,126 | B2 | 11/2012 | Moya, Jr. |
| 8,461,890 | B1 | 6/2013 | Chen |
| 8,706,175 | B2 | 4/2014 | Cho |
| 9,308,767 | B1 | 4/2016 | Waldron |
| 9,699,283 | B2 | 7/2017 | Aldana et al. |
| 10,128,887 | B2 | 11/2018 | Balmer |
| 10,389,398 | B1* | 8/2019 | Garcia ..................... A45C 3/02 |
| 2014/0117193 | A1 | 5/2014 | Wong |
| 2014/0355139 | A1* | 12/2014 | Begay .................. F16M 11/041 359/818 |
| 2015/0201113 | A1 | 7/2015 | Wood |
| 2017/0264329 | A1 | 9/2017 | Balmer |

FOREIGN PATENT DOCUMENTS

| JP | 5220930 B1 * | 6/2013 |
| KR | 20110013174 A * | 2/2011 |
| KR | 1020140074790 A * | 1/2013 |
| WO | WO-2014003767 A1 * | 1/2014 | ........... G03B 17/561 |

* cited by examiner

*Primary Examiner* — Hsinchun Liao
(74) *Attorney, Agent, or Firm* — Kirk A. Buhler; Buhler & Associates Patenting

(57) ABSTRACT

Improvements a folding stand for a cell phone camera have been disclosed. The stand starts in a flat form that can be easily transported in a folder or a binder. The stand can start as a single or multi layers of material that are hinged together. The hinged parts interconnect or lock together. After use, the parts can be broken-down or collapsed to return to a flat configuration where the flat form can be easily transported. The stand elevates a cell phone, tabled or camera above a surface and for the stand to have a hole, slot or ledge for the camera. A user can freely draw, write and describe what they are doing as the images are being captured. When a user has finished the user can turn the camera off and save or store or share the expression that was captured.

18 Claims, 4 Drawing Sheets

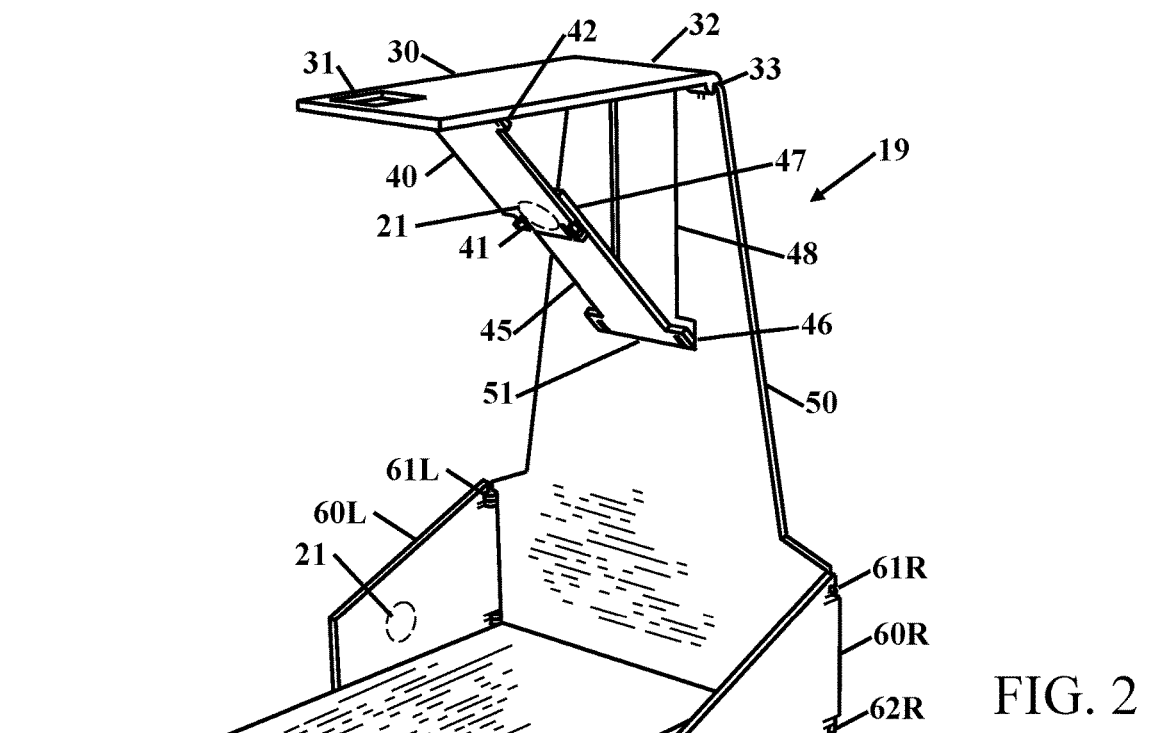
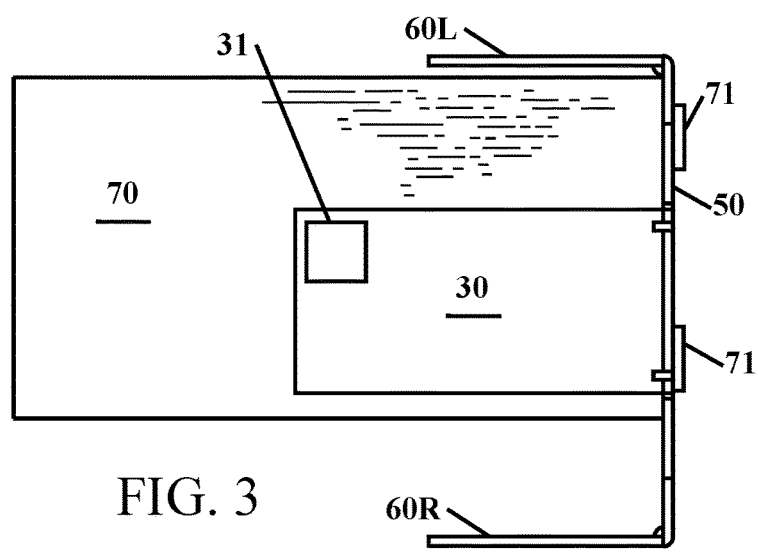
FIG. 2
FIG. 3

FOLDING STAND FOR A CELL PHONE CAMERA

CROSS REFERENCE TO RELATED APPLICATIONS

This application claims the benefit of Provisional Application Ser. No. 62/858,432 filed Jun. 7, 2019 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a stand for use with a cell phone camera. More particularly, the present folding stand for a cell phone camera is configured to be retained in a typical three-ring binder and can be quickly folded and a cell phone placed on top of the folded stand to capture images from the camera.

Description of Related Art Including Information Disclosed Under 37 CFR 1.97 and 1.98

Many people have sparks of creativity where they want to capture their thoughts that can often be creative drawing, doodling or writings. These thoughts are often fleeting thoughts, and once the inspiration passes it may never return. Capturing these thoughts requires setting-up a camera to record the artistic expression of the thought. Most people carry with them a cell phone, table or computer with a camera. These cameras do not have a stand that allows the camera to capture the expression. The other options can be to have a person hold the cell phone or for the user to hold the camera in one hand while they write or draw with another hand. A number of patents and or publications have been made to address these issues. Exemplary examples of patents and or publication that try to address this/these problem(s) are identified and discussed below.

U.S. Pat. No. 8,303,126 issued on Nov. 6, 2012 to Randall Moya Jr. and is titled Cell Phone Stand. This patent discloses a cell phone stand to secure a cell phone or a camera with video recording capability that includes a plurality of support legs with a plurality of front support legs, a plurality of side support legs and a plurality of back support legs, a cell phone base plate or a camera base plate with a raised perimeter to secure the cell phone or camera that is supported by the support legs. While this patent discloses a stand for a cell phone, the structure is not foldable into a flat orientation.

U.S. Pat. No. 8,706,175 issued on Apr. 22, 2014 to Richard H. Cho and is titled Phone and Tablet Stand. This Patent discloses a phone and tablet stand that includes a rotatable mounting head that attaches a tablet to the phone and tablet stand, attachment magnets that are evenly disposed on a rotatable mounting head to magnetically attach a tablet to the phone and tablet stand and an adjustable stand that includes a stein and a pair of adjustment knobs. The phone and tablet stand also includes a base that provides stability to the phone and tablet stand. While this patent provides a stand for a cell phone, the stand essentially holds the phone in a vertical orientation.

U.S. Pat. No. 10,128,887 issued on Nov. 13, 2018 to Noah Balmer and is titled Multi-Configuration Clamp System for Electronic Device. This patent discloses a support system which allows for the use and mounting of a smart phone, or similar electronic device, in a variety of ways. The support system may be adapted to function as a hand grip while supporting the smart phone during image acquisition, or while watching images on the smart phone. In another configuration, the support system may be adapted to attach to the user's belt. In another configuration, the support system may function as a support stand. This patent provides multiple mounting options for a cell phone but does not allow the phone to mounted to look down onto a surface.

What is needed is a cell phone stand that can be transported in a flat condition and can be quickly and easily folded to support a cell phone to capture the thought or the expression. The proposed folding stand for a cell phone camera provides the solution.

BRIEF SUMMARY OF THE INVENTION

It is an object of the folding stand for a cell phone camera for the stand to be a flat form when not used. This allows the stand to be easily transported by a student or other person in a folder or a binder. The stand can be fabricated with holes that allows the stand to be held in a three-ring binder. The stand can start as a single layer of two or three layers of material that are hinged together. The hinged parts interconnect or lock together. After use, the parts can be broken-down or collapsed to return to a flat configuration where the flat form can be easily transported in a folder or backpack. The stand can be fabricated from a rigid or semi-rigid material such as, but not limited to paper, plastic or metal.

It is an object of the folding stand for a cell phone camera for the stand to form a three-dimensional stand that provides enough structural strength to support the weight of a cell phone, tablet or camera. The strength is with gussets and supporting braces that extend from table surfaces, vertical surfaces and horizontal or angular surfaces where the device is supported without a user providing and support to hold the image capture device.

It is another object of the folding stand for a cell phone camera to elevate the cell phone, tabled or camera above a surface and for the stand to have a hole, slot or ledge where an image or movie can be captured under the stand. The stand provides a hands-free mechanism for a user as they use their mobile device.

It is still another object of the folding stand for a cell phone camera to capture images when they are inspired. A user can simply assemble the stand, place their cell phone on the stand and start the camera. This allows a user to freely draw, write and describe what they are doing as the images are being captured by the camera. When a user has finished drawing or writing they can turn the camera off and save or store or share the expression that was captured by the camera.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 2 shows a perspective view of the folding stand for a cell phone camera.

FIG. 3 shows a top view of the folding stand for a cell phone camera in an open configuration.

DETAILED DESCRIPTION OF THE INVENTION

Figure 1:
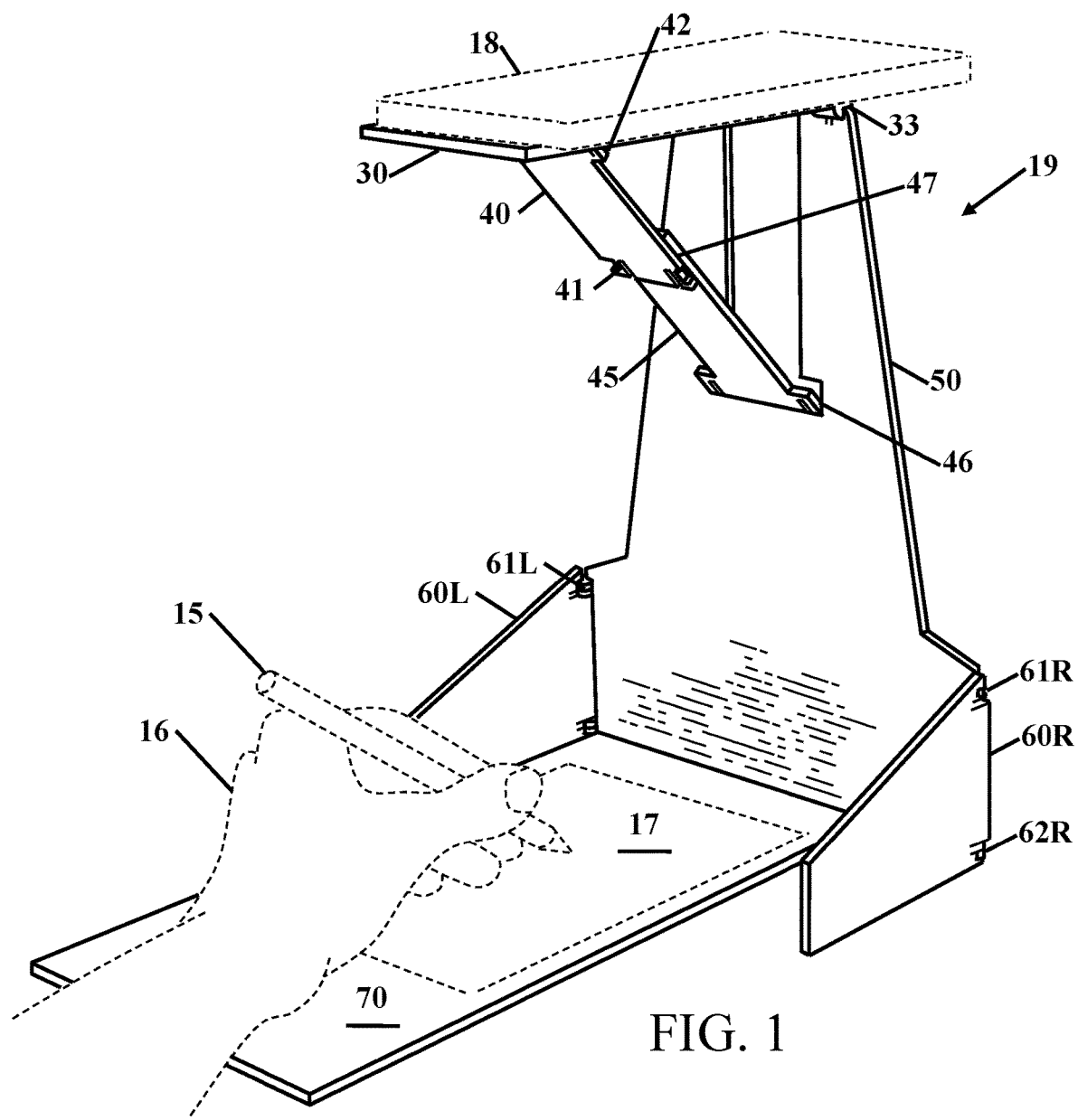
FIG. 1 shows a folding stand for a cell phone camera in an environment of use.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description | |
| --- | --- |
| 11 ring(s) | 12 folder/binder |
| 15 writing instrument | 16 hand |
| 17 paper | 18 cell phone |
| 19 folding stand for a cell phone camera | 21 magnet |
| 30 phone rest | 31 opening |
| 32 back edge | 33 top hinge |
| 40 upper brace | 41 hinge |
| 42 tab | 45 lower brace |
| 46 lock | 47 lip |
| 48 opening | 50 back member |
| 51 support lip | 60L/R side arms |
| 61L/R side upper hinge | 62L/R side lower hinge |
| 70 lower member | 71 locking tab(s) |
| 80 binder tab | 81 holes |

FIG. 1 shows a folding stand for a cell phone camera 19 in an environment of use. When a student is doing homework or classwork, they can detach and unfold it allowing them to place their phone 18 on top of a phone rest 30 pointing the phone's camera down to an attached white board of the lower member 70 below. While a cell phone is shown and described, it should be understood that any device with a camera, like a tablet, including just a camera can be used. In this figure the hand 16 of a user is shown with a writing instrument 15 as then write on a sheet of paper white board 17. The student can either record themselves doing a problem to keep in a personal library for recall and review or submit the video to their teacher as a homework assignment to receive feedback. Students can also use the folding stand for a cell phone camera 19 to have a live video chat with a tutor or friend to get assistance. By having students record themselves as they work and talk their way through a problem, they are activating deeper levels of understanding which will allow them to retain and truly master the content.

The folding stand for a cell phone camera 19 has a lower member 70 that locks into a back member 50. Two hinged side arms 60L and 60R, hinge through hinges 61L, 61R and 62R on the back member 50. The side arms 60L and 60R provide a stable support for the back member 50 to remain vertical. The phone rest 30 hinges through the top hinge 33 on the back member 50. The phone rest 30 is braced with at least one brace. In the embodiment shown there is an upper brace 40 and a lower brace 45. The lower brace 45 fits within an opening 48 in the back member 50. The top of the upper brace 40 has at least one tab 42 that engages into the underside of the phone rest 30. The two brace members connect with a hinge 41 and the back lip 47 of the lower brace 45 on the back of the upper brace 40 prevents over-rotation of the hinge 41. The bottom of the lower brace 45 has a lock 46 that engages into the back member 50.

FIG. 2 shows a perspective view of the folding stand for a cell phone camera. Without the phone the opening 31 for the camera can be seen. While a particular location and size is shown for the cell phone camera it should be understood that the opening 31 could be round, rectangular or could be removed so a user places the camera over the end/edge of the phone rest 30 so the camera can look down onto the writing surface or lower member 70. This figure also shows optional magnet(s) 21 in various locations to hold the side arms 60L/R of the stand closed when the stand is folded shut.

Figure 4:
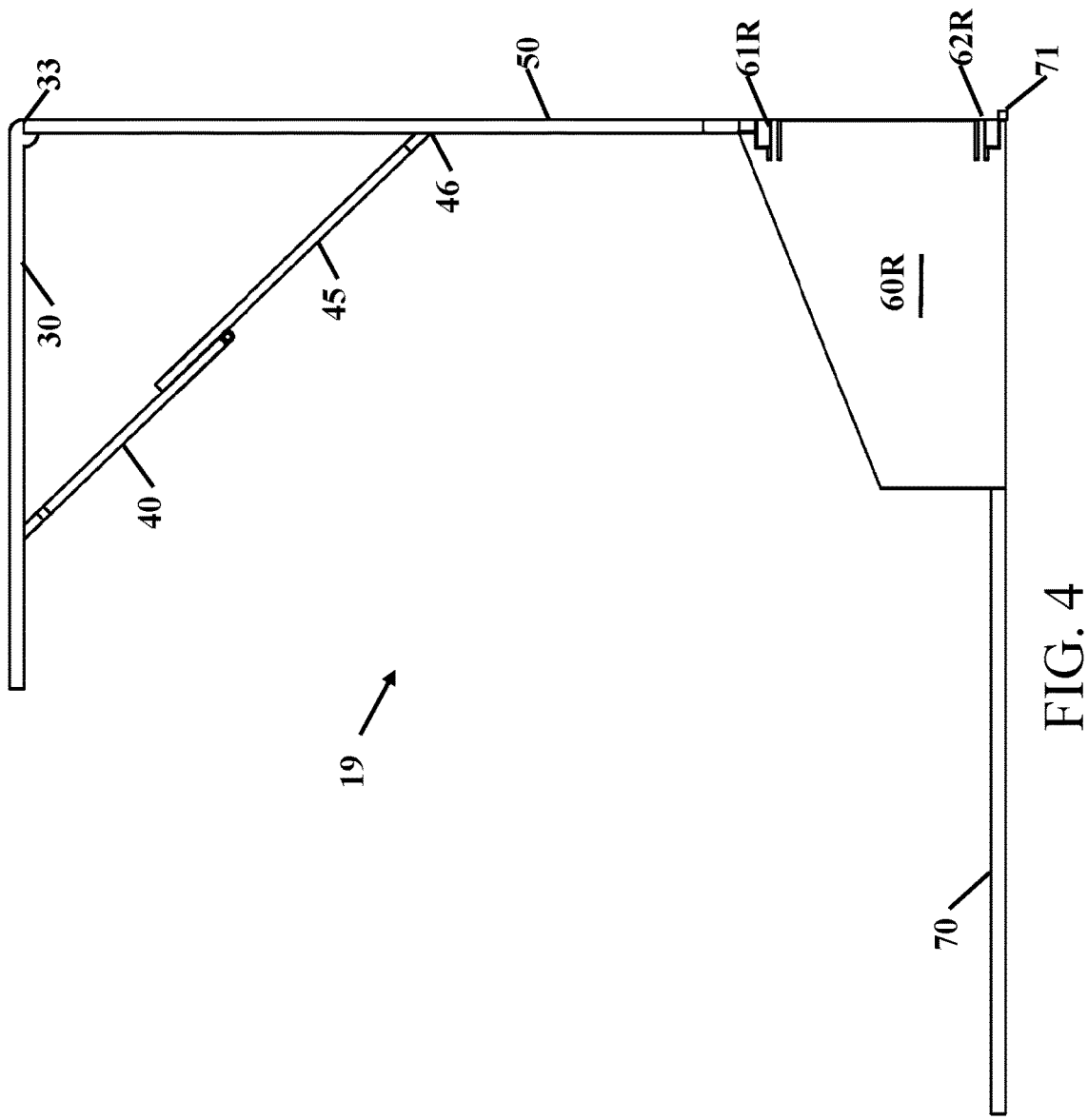
FIG. 4 shows a side view of the folding stand for a cell phone camera in an open configuration.

FIG. 3 shows a top view of the folding stand for a cell phone camera 19 in an open configuration and FIG. 4 shows a side view of the folding stand for a cell phone camera 19 in an open configuration. In FIG. 3 the back of the lower member 70 shows locking tabs 71 that secure the back member 50 to the lower member 70. The side arms 60L and 60R are shown on the sides of the lower member 70. The opening 31 for the camera is essentially centered over the top of the lower member 70. In FIG. 4 the upper brace 40 and the lower brace 45 are shown supporting the phone rest 30 with the back member 50. Top hinge 33 is shown between the phone rest 30 and the back member 50. The side hinges 61R and 62R are shown joining the back member 50 to the side arm 60R. The locking tab 71 is also shown extending past the back of the back member 50.

Figure 5:
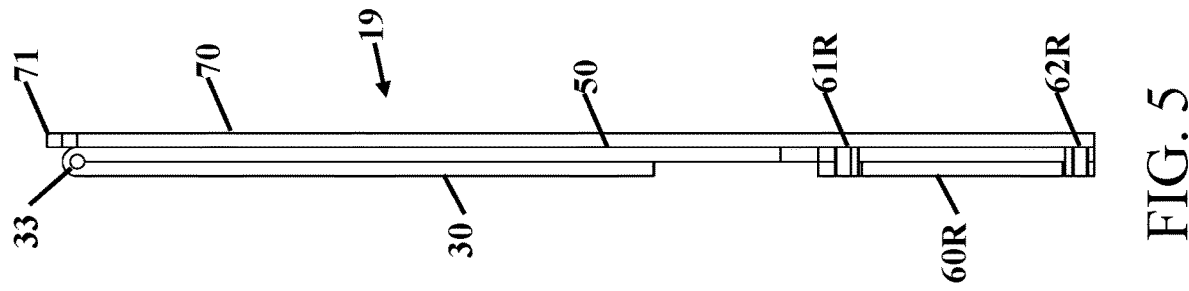
FIG. 5 shows a side view of the folding stand for a cell phone camera in a folded configuration.

FIG. 5 shows a side view of the folding stand for a cell phone camera 19 in a folded configuration. When the folding stand for a cell phone camera 19 is folded it has three layers that are easily transported and stored. The back of the stack is the lower member 70 with the locking tabs 71 at one end. The middle layer is the back member 50 and the top of the stack is the phone rest 30 and the side arms 60R. The hinges 61R and 62R are shown joining the side arm 60R to the back member 50. The top hinge 33 is also shown joining the phone rest to the back member 50. The upper brace and the lower brace are hidden within the stack. In this folded orientation the folding stand for a cell phone camera 19 can be transported or stored in a standard three-ring binder as shown in the next figure.

Figure 6:
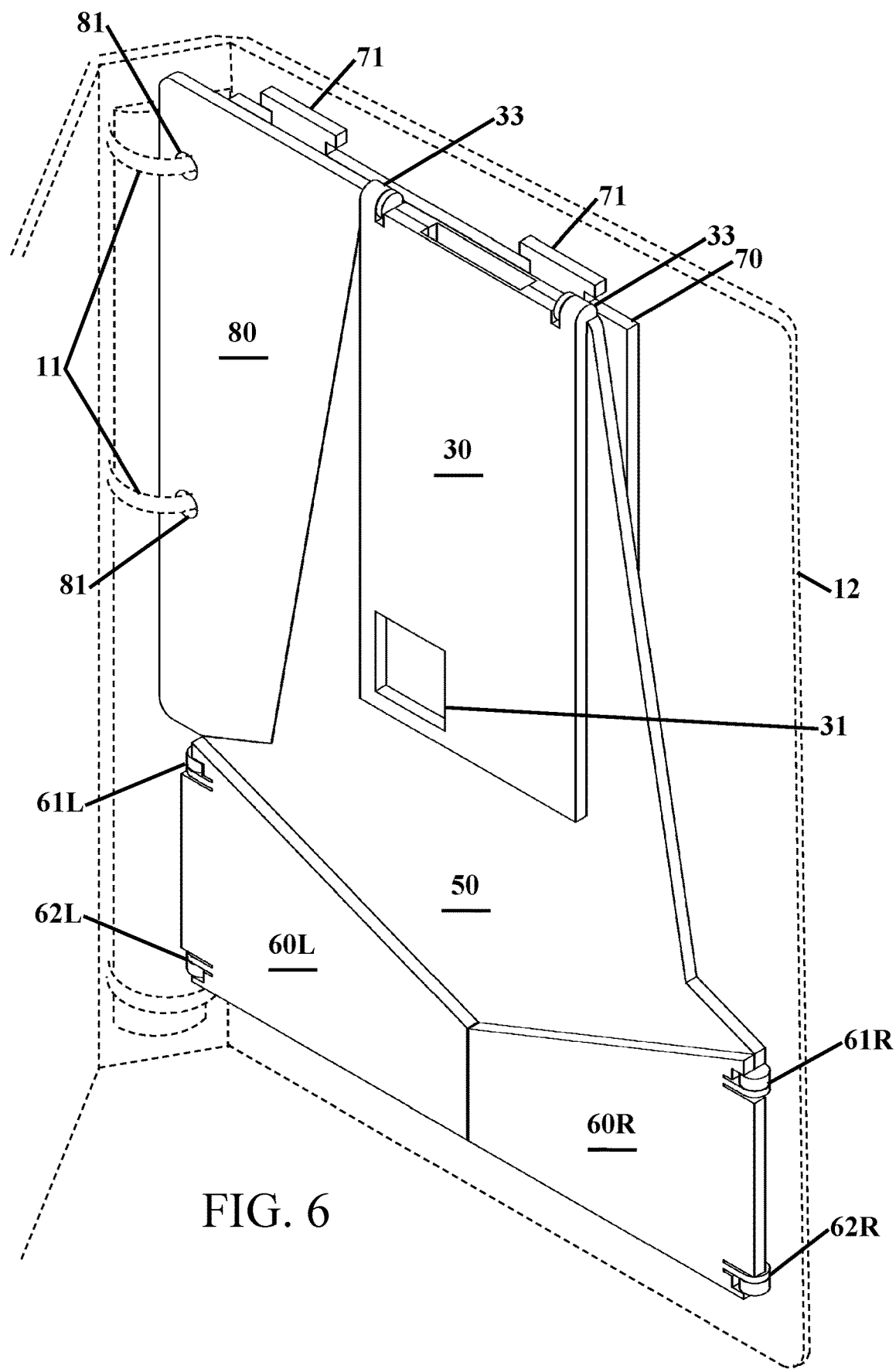
FIG. 6 shows a perspective view of a folded folding stand for a cell phone camera in a notebook or binder.

FIG. 6 shows a perspective view of a folded folding stand for a cell phone camera 19 in a notebook, folder or binder 12. The folding stand for a cell phone camera 19 is a useful tool for teaching and learning because it provides a platform for student to actually show what they know at a moment's notice using what they already carry around in their back pack a phone and a 3-ring binder. This figure shows the locking tabs 71 at the top of the lower member 70. The top hinges 33 are shown along with the side hinges 61L/R and 62L/R. There are no loose pieces to locate or lose, the folding stand for a cell phone camera 19 can be quickly unfolded for use and then folded back down when not needed. The stand can be fabricated from a rigid or semi-rigid material such as, but not limited to paper, cardboard, plastic or metal.

The folding stand for a cell phone camera 19 allows a person to amass a personal library of a years' worth of their own videos. In this figure the folding stand for a cell phone camera 19 is shown with a binder tab 80 that has holes 81 to enable the folding stand for a cell phone camera 19 to be retained in the binder 12 using the rings 11 of the binder 12. This makes the folding stand for a cell phone camera 19 available to the user when needed to be quickly unfolded, a phone placed on top of the folding stand for a cell phone camera 19 with camera facing down through the opening 31 where the user can capture their thoughts and keep a record.

Thus, specific embodiments of a folding stand for a cell phone camera have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A folding stand for a cell phone camera comprising:
   a lower member that temporally on with a back member;
   at least one side arm that hinges on said back member;
   a phone rest that hinges from said back member and is supported with at least two braces between said phone rest and said back member wherein at least one of said at least two braces has a lip that extends beyond a hinge that connects said at least two braces, and
   said folding stand is configured to fold into a flat orientation.

2. The folding stand for a cell phone camera according to claim 1, wherein said at least one side arm is configured to fold flat against said back member.

3. The folding stand for a cell phone camera according to claim 2, wherein there are two side arms.

4. The folding stand for a cell phone camera according to claim 3, wherein said two side arms are configured to fold flat against said back member with free ends of said two side arms being folded in proximity to each other when said two side members are folded onto said back member.

5. The folding stand for a cell phone camera according to claim 1, wherein said phone rest is configured to fold flat against said back member.

6. The folding stand for a cell phone camera according to claim 1, wherein said stand is fabricated from a rigid or semi-rigid material including at least one of paper, cardboard, plastic or metal.

7. The folding stand for a cell phone camera according to claim 1, wherein said stand has at least two holes that are configured to retain said stand in a three-ring binder.

8. The folding stand for a cell phone camera according to claim 1, wherein said at least two braces are hinged together.

9. The folding stand for a cell phone camera according to claim 1, wherein said lip prevents over-rotation said hinge.

10. The folding stand for a cell phone camera according to claim 1, wherein said phone rest has at least one through opening.

11. The folding stand for a cell phone camera according to claim 10, wherein said at least one through opening is centered over said lower member.

12. The folding stand for a cell phone camera according to claim 10, wherein said phone rest is centered on said back member.

13. The folding stand for a cell phone camera according to claim 1, wherein said lower member creates a flat writing surface.

14. The folding stand for a cell phone camera according to claim 1, wherein said lower member has at least one tab that is configured to lock into a slot in said back member.

15. The folding stand for a cell phone camera according to claim 1, wherein said at least two braces has a lock that retains said at least two braces on said back member.

16. The folding stand for a cell phone camera according to claim 1, wherein said lip prevents over-rotation of said hinge.

17. The folding stand for a cell phone camera according to claim 1, wherein a lower brace fits within an opening in said back member.

18. The folding stand for a cell phone camera according to claim 1, wherein said phone rest is essentially parallel to said back member when said folding stand is unfolded.

* * * * *